United States Patent Office 3,372,996
Patented Mar. 12, 1968

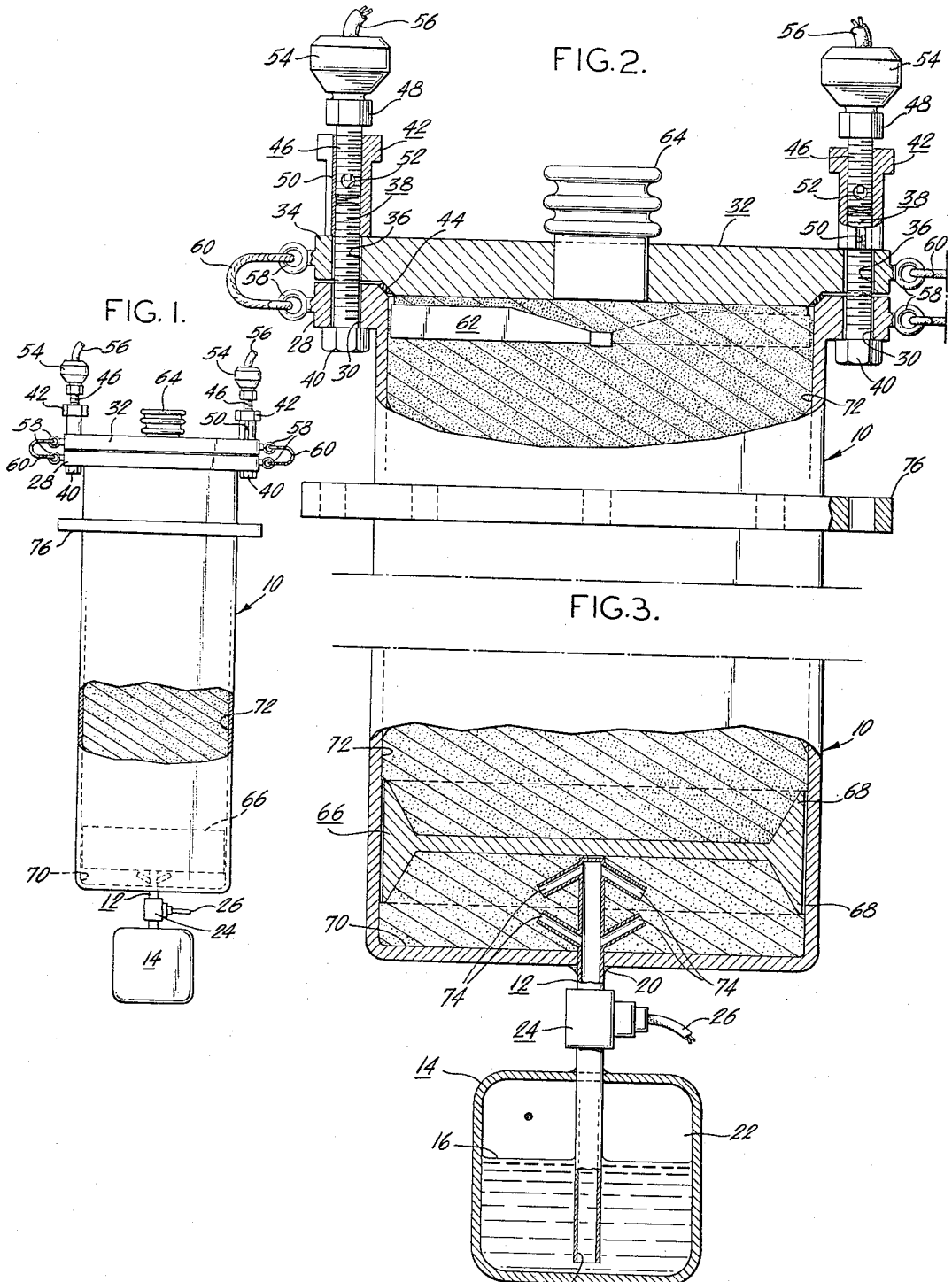

3,372,996
UNDERWATER GAS GENERATOR
Wayne T. Barrett, Malvern, and Charles L. Scheer, Berwyn, Pa., assignors to Foote Mineral Company, Exton, Pa., a corporation of Pennsylvania
Filed Oct. 14, 1963, Ser. No. 317,100
8 Claims. (Cl. 23—282)

ABSTRACT OF THE DISCLOSURE

A gas generator, particularly adapted for underwater use in forming hydrogen gas by mixing water with a paste of lithium hydride in a water soluble organic dispersant, utilizes a container having a cover at one end secured by explosive bolts and a piston within the container movable from near the closed end toward the open end of the container. The container, which is normally sealed and provided with a bellows for equalizing pressures, is adapted to contain the lithium hydride paste on both sides of the piston. A pressurized source of water is connected by way of an explosively actuatable valve to the lower closed interior end of the container, so that, when the explosive bolts and the valve are operated simultaneously, water is forced into the lower end of the container, which reacts with the lithium hydride paste therein to generate a gas for driving the piston toward the open end of the container. The remaining lithium hydride paste is thereby rapidly swept out through the open end of the container around the edges of the cover, an arrangement of vanes preferably providing turbulent mixing of the expelled lithium hydride with the surrounding water to produce hydrogen. The arrangement is suitable for generating gas to expel water from pontoons, or for the filling of weather balloons, for example.

---

The present invention relates generally to an underwater gas generator and more specifically to a generator of a type adapted for very rapid and foolproof operation to generate a controlled large volume of hydrogen very rapidly.

Heretofore devices and chemicals have been used for the generation of hydrogen gas by inserting various chemicals into water with which the chemical reacts to generate hydrogen gas. The devices and chemical compositions heretofore utilized however were usually of a type susceptible of slow generation of hydrogen gas and due to the construction of the devices and the chemical composition used many times were not satisfactory.

There are numerous occasions where it is desirable to be able to rapidly produce hydrogen gas within large bodies of surrounding water. One example of this would be in connection with salvage operations for sunken ships or other like vessels by the use of pontoons which in the course of the salvage operations are filled with water, sunken and attached to the vessel and subsequently the water in the pontoons is expelled by means of compressed air, pumps or the like. This then lends buoyancy to the pontoons and permits raising of the vessel. This has been an extremely slow and tedious operation and under some circumstances, it might be desirable and/or necessary to raise such a vessel or other type of vehicle very rapidly for various reasons such as trapped personnel etc. The present invention is ideally adapted for such use within a minimum time lapse and with good reliability.

Another use to which the present invention can be put is for the filling of weather balloons and the like in remote or unaccessible areas where there is an availability of water, since the present device can be easily shipped and stored for use when desired without the necessity of transporting heavy and cumbersome hydrogen gas containers of known types. When it is desired to inflate the balloons, the device can be immersed in water in a suitable container and upon actuation, large volumes of hydrogen gas can be made rapidly available.

The present invention is also susceptible of use to exhaust or blow ballast tanks of submarines within a short duration of time which under circumstances may be desirable.

Additional uses and advantages of the present invention will be more readily apparent from the following detailed description of an embodiment thereof when taken together with the accompanying drawings in which:

FIG. 1 is an elevational view of an embodiment of the invention wth a portion being broken away for clarity;

FIG. 2 is an enlarged elevational view, partly in section and partly broken away of the upper portion of the device of FIG. 1 showing details of closure and actuating means; and FIG. 3 is a view similar to FIG. 2 but pertaining to and showing the lower portion of the device.

The underlying principle of the present invention consists in a container in the nature of a cartridge which contains a lithium hydride paste which, upon actuation, is expelled into a surrounding body of water. The properties of the paste are so devised and adjusted as to permit a smooth, complete reaction with the water to produce a large volume of hydrogen gas within a short period of time. The lithium hydride paste is in the nature of a slurry and is prepared with a water soluble, organic dispersant which in the end product has the following advantages:

(a) Controls the reaction rate to prevent violent hydrolysis of very fine lithium hydride particles.

(b) Prevents caking of the hydride to insure a smooth even hydrolysis.

(c) The liquid dispersant provides incompressibility without change in characteristics, and imparts lubricity.

Various organic solvents of the type including tetrahydrofuran, diglyme, dioxane, trialkyl amines are nonreactive toward lithium hydride and yet water soluble. These have been found to give satisfactory conditions. Additional details of the lithium hydride paste are available in co-pending application Ser. No. 317,101, filed Oct. 14, 1963, and assigned to a common assignee with the present application.

The drawings disclose a specific type of cartridge or container for the lithium hydride paste which is susceptible of rapid foolproof operation and yet is of a simple and relatively inexpensive construction. The container consists of a rigid walled cylinder 10 closed at one end but having an opening therethrough into which extends a pipe 12 and which also extends into a smaller diameter cylinder or casing 14 having a substantially smaller volume than the container 10. The container 14 is adapted to be partially filled with water as shown at 16 and into which the open end 18 of pipe 12 extends. The gas generator as shown in the drawings is adapted for operation in a vertical position as shown to insure that the water is accessible to the open end. For different applications, the pipe portion extending into container 14 could be varied to permit different operating positions. The pipe 12 is secured to the containers 10 and 14 in a fluid and pressure tight manner such as by welding as at 20. The space 22 above the water 16 in container 14 is adapted to contain nitrogen gas or the like at very high pressures as will be defined hereinafter. The purpose of pressurizing this container is for the purpose of expelling the water therefrom through the pipe upon actuation of the device and this is accomplished by means of a normally closed high pressure valve 24 and which can be explosively actuated. This valve is of a known type, of a waterproof construction and properly shielded leads 26 extend from the valve to a desired actuating station (not shown).

The open end of container 10 has a flange 28 with bolt holes 30 therethrough and the opening is closed by a cover 32 similar to heads used on pressure vessels. The cover 32 has a flange 34 which has bolt holes 36 which, similar to bolt holes 30, have a diameter which provides a free or slip fit with bolts 38 which are adapted to secure the cover on the container. The lower ends of bolts 38 have bolt heads 40 abutting against the lower surface of flange 28. Elongated nuts 42 are in screw threaded engagement with the upper exposed ends of bolts 38 and serve in conjunction with bolts 38 to secure the cover 32 on cylinder 10. An O ring seal 44 is interposed between cover 32 and cylinder 10 to insure a water and air tight seal.

Explosive bolts 46 are in screw threaded engagement with the free ends of elongated nuts 42 and have bolt heads 48 to permit insertion in and tightening with respect to nuts 42. Nuts 42 have slots 50 extending along the length thereof which serve as weakened fracture areas and bolts 46 have openings or pockets 52 in which an explosive charge is contained with actuator means therefore generally designated 54 with shielded leads 56 leading to a suitable electrical energizing source and an actuator switch or the like (not shown). Explosive bolts of this type are commercially available such as those sold by E. I. du Pont de Nemours & Company (Inc.) under the named of "Du Pont Explosive Releases."

Eyes 58 are attached to flanges 28 and 34 and are interconnected by wires or cables 60 to make a captive cover arrangement of cover 32 and limit outward movement thereof when the device is actuated.

Distributing vanes 62 are provided which may be attached to cover 32 or to the interior of cylinder 10 and serve to insure thorough mixing of the lithium hydride paste, in a number of streams, with the water surrounding the generator upon actuation of the device.

A pressure equalizing bellows 64 is mounted on cover 32 and opening into the interior of cylinder 10. This serves to automatically maintain equality of internal and external cylinder pressures through a range of external pressure fluctuations of substantially 0 lbs. p.s.i. to several thousand lbs. p.s.i. The bellows are capable of withstanding hundred of thousands of flexures and will permit compression and release of pressure of the cylinder contents by approximately, in one embodiment, 2% by volume. By this means, hydrostatic transmission of pressure is accomplished throughout the gas generator containing lithium hydride paste.

Within cylinder 10, in proximity to the closed end thereof, there is a loose-fitting piston 66 having extended feet 68. The piston is used, upon actuation of the device, to cause all contents of cylinder 10 to be swept forth or discharged into the surrounding water when generation of hydrogen begins. The feet are to insure against cocking or jamming of the piston during its travel in cylinder 10.

Piston 66 divides the interior of cylinder 10 into a small compartment 70 and a large compartment 72, each of which are adapted to be filled with the lithium paste. The inner end of pipe 12 extends into compartment 70 and is provided with a series of nozzles 74 and which serve to spread the water from container 14 upon actuation of the device to insure optimum dissemination and mixing of water with the lithium paste. Piston 66 also serves to prevent "channeling" of high velocity gases through the mass of lithium paste in cylinder 10.

A mounting flange 76, or other desired means can be provided for mounting the device where desired and electrical actuating means can be located at desired positions or stations.

In one practical embodiment of the invention various dimensions, contents, pressures etc. have been found to give the desired results, and these specifications are set forth hereinbelow, as one possible example only.

The hydrogen generator is 16 inches in diameter and about 4 feet long. At one end, integral with the larger cylinder, is the smaller diameter cylinder containing a charge of water pressurized up to 10,000 lbs. per square inch with nitrogen gas. Between the two cylinders is the high pressure valve, normally closed, but explosive actuated. The cylinder containing the high pressure nitrogen is partly filled with water. The weight of the water contained is approximately 5 pounds. The total internal volume of the main gas generator is filled with lithium hydride paste to ensure pressure transmission throughout the device. It is thus not necessary for the device to withstand large pressure differentials across the shell. The larger cylinder contains 131 pounds of active LiH.

When it is desired to operate the device, an electrical circuit, powered by a battery, is closed, causing the instantaneous firing of the explosive actuated valve, and thus the opening of the valve. Substantially simultaneously the explosive bolts holding on the cover are released. The cover moves out about 3 inches.

At the first release of the high pressure water, the entire contents of the nitrogen-water cylinder are discharged within the closed end of the gas generator containing lithium hydride, permitting rapid reaction of the small amount of water with the small amount of lithium hydride behind the piston to generate a large volume of hydrogen gas which sweeps the paste within the generator out in an extruded stream through the annular space provided by the separation of the head from the main body of the cylinder. The distributing vanes at this point ensure the thorough mixing of the LiH paste, in a number of streams, with the water surrounding the generator.

The time required for the initiation and discharge of the LiH paste contents of this gas generator into the surrounding water is less than 5 seconds.

The paste reacts promptly but smoothly as the first portions encounter the water. The reaction continues as the final quantities are being displaced from the cylinder by the traverse of the piston. As noted above, distribution of the paste is ensured by deflectors. At the end of about 5 seconds all of the paste has been displaced from the cylinder and is reacting to generate hydrogen. At the end of 20 seconds, all of the reaction ceases.

To summarize, the operation of the gas generator of the present invention is as follows:

(1) The valve 24 is opened explosively, and the cover 32 forced off through the use of explosive bolts 46. Both actions occur simultaneously.

(2) By means of the gas pressure in the small pressure vessel 14, the water 16 contained is injected into the smaller compartment 70 of the large cylinder 10.

(3) Within a period of two to three seconds, the water reacts completely with lithium hydride to generate a volume of gas approximately three times the volume of the whole cartridge.

(4) The internal gas pressure expels the main bulk of the lithium hydride paste into the water surrounding the gas generator. The purpose of the piston 66 is to prevent channeling of the hot gas through the main bulk of paste.

(5) Complete reaction of the expelled lithium hydride paste with water occurs within 20 seconds.

While one specific embodiment of a device in accordance with the present invention has been shown, manifestly modifications can be effected without departing from the scope and spirit of the invention as defined in and limited solely by the appended claims.

We claim:

1. A gas generator comprising a container having an open end, a cover for closing and sealing said open end, rupturable connecting means for said cover, a loose fitting piston slidably mounted in said container and normally substantially dividing the interior thereof into a large compartment adjacent said covered open end of said container and a small compartment adjacent the opposite end of said container, each compartment being adapted to contain a chemical mixture reactable with a fluid to generate a gas, means for introducing such a fluid into said smaller compartment to react with the chemical therein to produce a gas for forcing said piston toward said open end of said container, and means for rupturing said connecting means substantially simultaneously with said production of said gas in said smaller compartment to permit opening of said cover and expelling of the contents of said larger compartment into a further body of such a fluid to generate a greater volume of the gas, the motion of said piston serving to sweep said contents out of said large compartment by way of said open end.

2. A gas generator as claimed in claim 1, said fluid introducing means comprising a second smaller closed container adapted to store a supply of the fluid under high gas pressure, a pipe interconnecting said smaller container and said smaller compartment, a rapid action valve in said pipe and actuatable to release the fluid under pressure into the smaller compartment.

3. A gas generator comprising a container having an open end, a cover for closing and sealing said open end, rupturable connecting means for said cover, a loose fitting piston slidably mounted in said container and substantially dividing the interior thereof into a small compartment and a large compartment, each compartment being adapted to contain a chemical mixture reactable with a fluid to generate a gas and means for introducing such a fluid into said smaller compartment to react with the chemical therein to produce a gas and expel the contents of said larger compartment into a further body of such a fluid to generate a greater volume of the gas, said fluid introducing means comprising a second smaller closed container adapted to store a supply of the fluid under high gas pressure, a pipe interconnecting said smaller container and said smaller compartment, a rapid action valve in said pipe and actuatable to release the fluid under pressure into the smaller compartment, said rupturable cover connecting means comprising at least one explosive bolt and actuating means therefore for rapid disconnection of said cover from said container.

4. A gas generator as claimed in claim 3, said rapid action valve comprising a normally closed high pressure valve explosively actuatable and actuating means therefore operably interconnected with said actuating means for said explosive bolts for substantially simultaneous actuation thereof.

5. A gas generator as claimed in claim 4, and including means interconnecting said cover and said container to limit relative displacement of said cover to form a peripheral discharge gap and material distributing vanes positioned in proximity to said discharge gap to facilitate distribution of material into the surrounding fluid.

6. A gas generator as claimed in claim 5, including a pressure equalizing bellows mounted on said cover and opening into said container for automatically maintaining equality of internal and external container pressures.

7. A gas generator as claimed in claim 1 for use under water to generate hydrogen, said generator containing a paste of lithium hydride in a water soluble organic dispersant substantially filling said container and adapted to form hydrogen gas when introduced into the water.

8. A gas generator as claimed in claim 6 for use under water to generate hydrogen, said generator containing a paste of lithium hydride in a water soluble organic dispersant substantially filling said container and adapted to form hydrogen gas when introduced into the water.

References Cited

UNITED STATES PATENTS

| | | | |
|---|---|---|---|
| 2,429,014 | 10/1947 | Christopher | 23—282 |
| 2,989,381 | 6/1961 | Musser | 23—281 |
| 3,268,298 | 8/1966 | La Costa et al. | 23—282 |

JAMES H. TAYMAN, JR., Primary Examiner.